Oct. 27, 1936.                    A. FRITZ                    2,058,677
                           CHRISTMAS TREE STAND
                   Filed Jan. 22, 1936            3 Sheets-Sheet 1
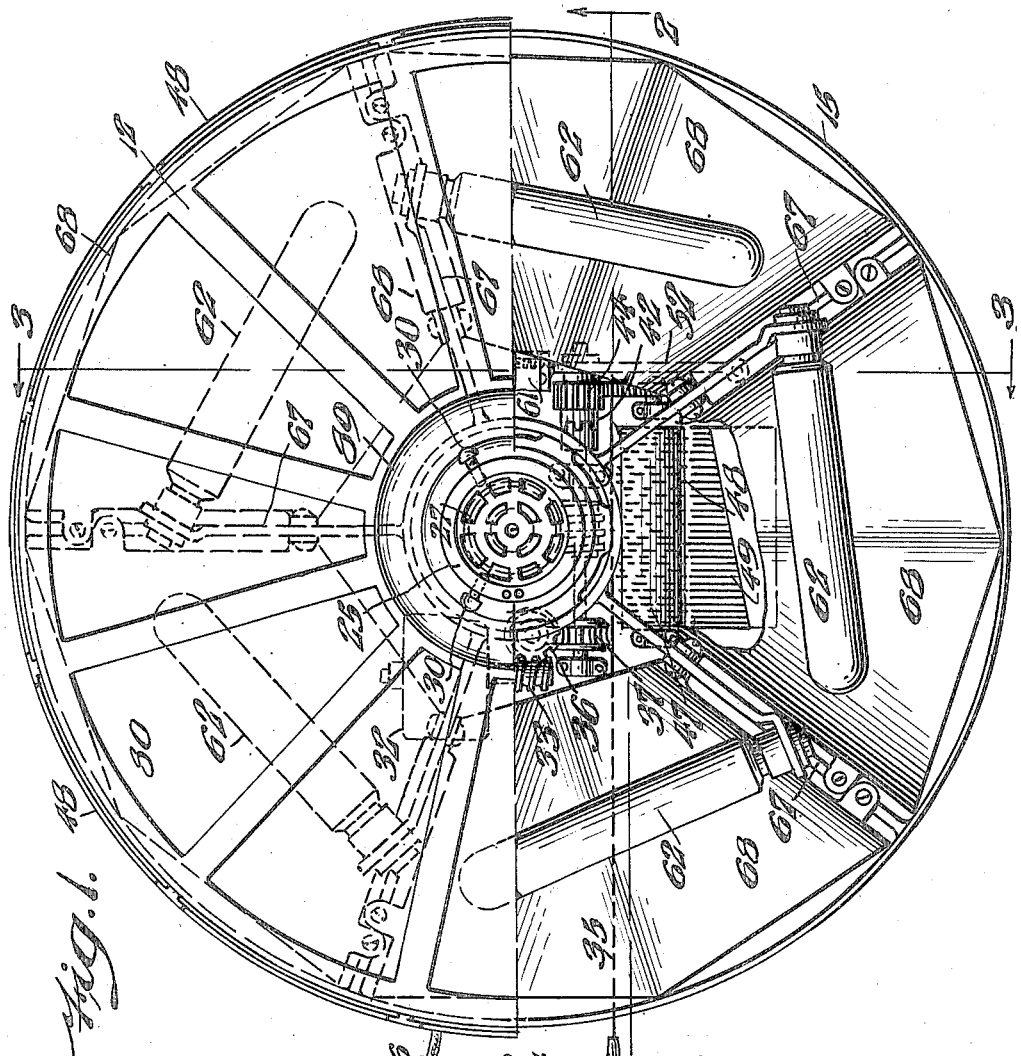
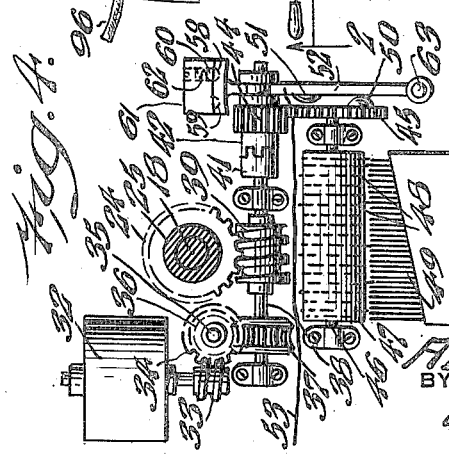
INVENTOR
*Adam Fritz,*
BY
*Louis Necho*
ATTORNEY

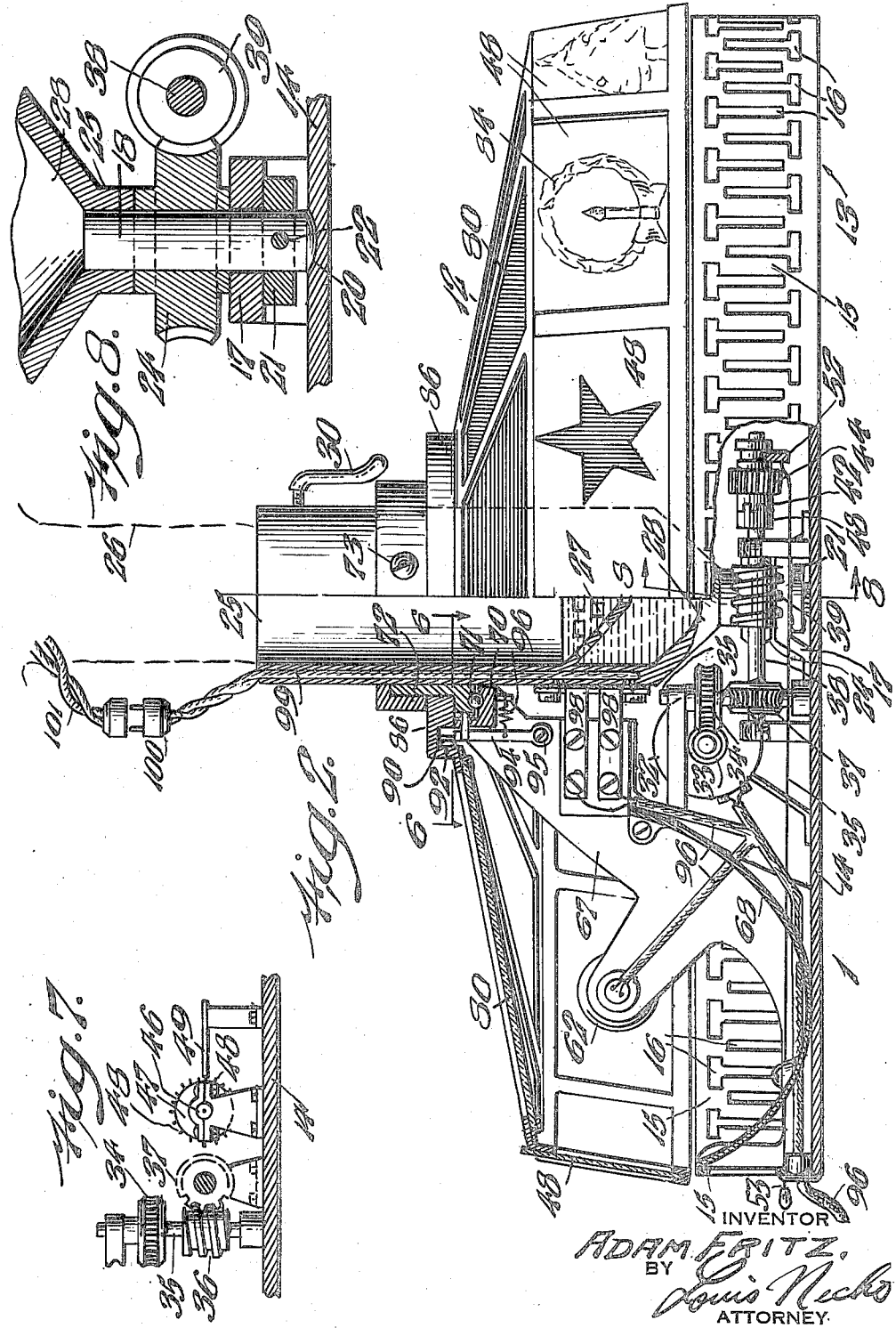

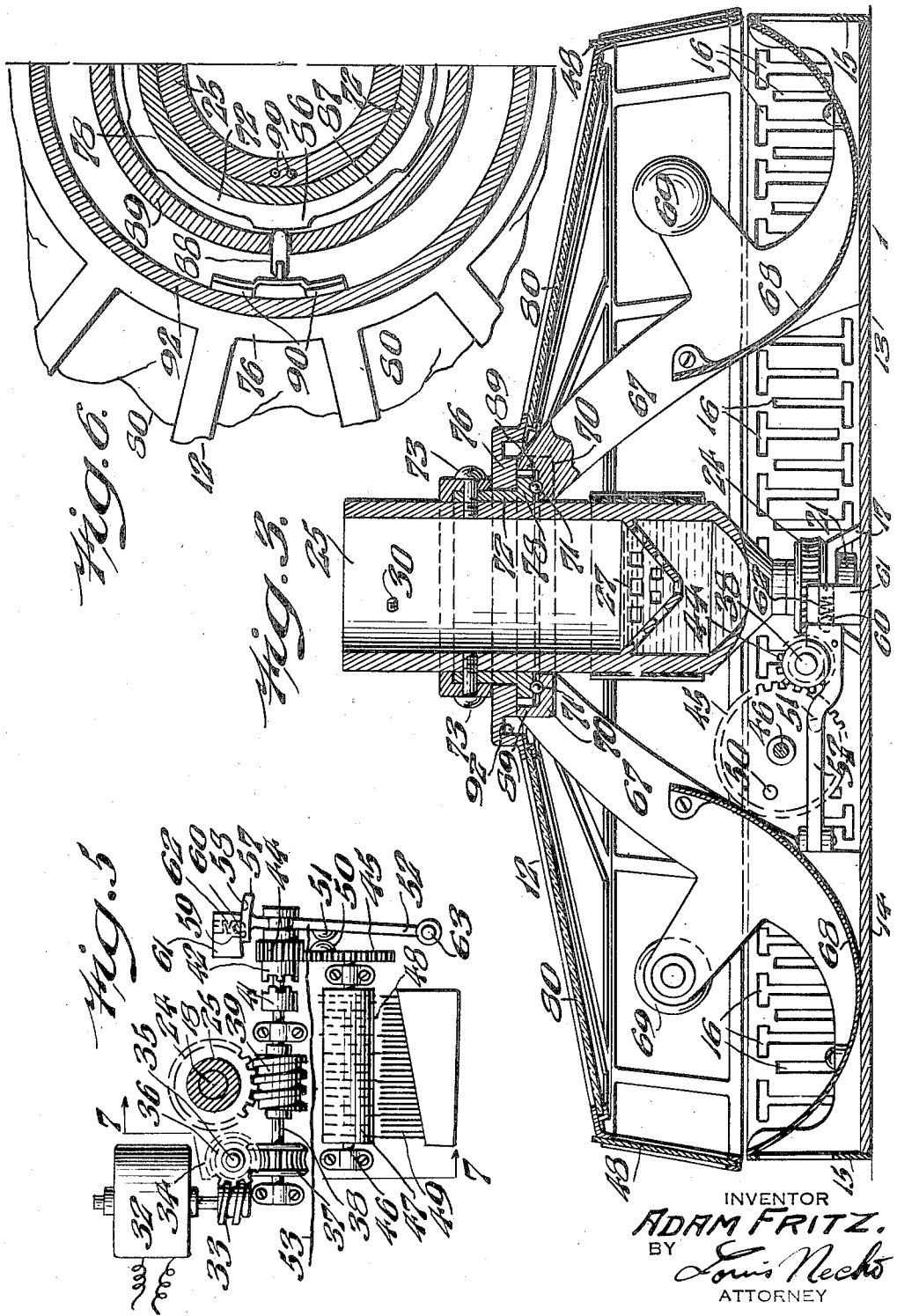

Patented Oct. 27, 1936

2,058,677

UNITED STATES PATENT OFFICE 2,058,677

CHRISTMAS TREE STAND

Adam Fritz, Philadelphia, Pa.

Application January 22, 1936, Serial No. 60,185

2 Claims. (Cl. 248—45)

My invention relates to a new and useful Christmas tree stand and it relates more particularly to a Christmas tree stand which serves to rotate a Christmas tree carried thereby, to illuminate said tree by means of a variety of simultaneous, or successive, colors, to display together with the tree, pictorial or inscriptional representations, or both, of biblical scenes and quotations appropriate to the occasion, and to produce musical accompaniment to the general effect as and when desired.

Christmas trees have, throughout the centuries, been mounted on a stand of some sort which consisted of a tripod, a bucket, or the like, on which the tree was retained often in a precarious position, said support being disguised as well as possible by artificial grass mats, or natural moss, or the like, and it is with a view to increasing the attractiveness, effectiveness and utility of the display that I have devised the novel construction and assembly hereinafter more fully described and illustrated in the accompanying drawings, in which, Fig. 1 represents a plan view of a Christmas tree stand embodying my invention, a portion of the upper casing being removed to show the internal construction.

Fig. 2 represents a view on line 2—2 of Fig. 1, certain parts being shown in section and certain parts being shown in elevation.

Fig. 3 represents a view similar to Fig. 2 but taken on line 3—3 of Fig. 1.

Fig. 4 represents a plan view of the operating mechanism shown detached and in position to actuate the musical device.

Fig. 5 represents a view similar to Fig. 4, shown in a position to actuate the entire stand, but not actuating the musical device.

Fig. 6 represents, on an enlarged scale, a section on line 6—6 of Fig. 2, showing details of construction.

Fig. 7 represents a section on line 7—7 of Fig. 5.

Fig. 8 represents, on an enlarged scale, a section on line 8—8 of Fig. 2.

Referring to the drawings in which like reference characters designate like parts, and more particularly to Figs. 2 and 3, it will be seen that my novel stand is composed generally of an upper rotary part generally designated by the numeral 12, and the lower stationary part generally designated as 13. The lower stationary part 13 comprises a base 14 and a vertical wall 15 which is provided with the cut-outs or perforations 16 which serve to lighten the construction, to improve the appearance, and to ventilate and allow for dispersion of heat. Mounted on the base 14 is a bracket 17 through which passes the stem 18, the bottom of which may or may not have a bearing relation to the base 14, as at 20. The stem 18 carries the collar 21 which is secured thereto by the pin 22, the collar 21 being bigger than the opening in the bracket 17 through which the stem 18 passes to prevent the stem 18 from being disengaged upwardly from the bracket 17. The stem 18 also carries, fixed thereto at a point above the bracket 17, the ring gear 24, and above the ring gear 24 the stem 18 carries the sleeve 25 which is adapted to support the Christmas tree 26 and to rotate with the stem 18 and the ring gear 24. The sleeve 25 is provided with a perforated false bottom 27 which is preferably of a generally conical form to facilitate seating and centering of the tree 26. Between the false bottom 27 and the real bottom 28 of the sleeve 25 a water chamber is provided from which water passes through the perforations in the false bottom 27 to surround the bottom of the tree 26 and keep the latter fresh for the few days of its use. One or more clamps 30 are provided in the upper portion of the sleeve 25 for clamping the tree 26 in proper centered position. In order to rotate the sleeve 25, and hence the tree 26, I provide the motor 32 which drives the worm 33 which in turn drives the gear 34 which rotates the shaft 35 which carries the worm 36 which engages the pinion 37 on the shaft 38 which carries the worm 39 which meshes with the gear 24 on the stem 18, thus rotating the sleeve 25 and the tree carried thereby.

In order to produce musical accompaniment, the shaft 38 is provided with the fixed clutch member 41 which is adapted to engage the complementary sliding clutch member 42. Secured to the sliding clutch member 42 is the cog 44 which is in mesh with the gear 45 on the shaft 46 which carries the roll 47 which has the pins 48 which are adapted to engage, selectively, the reeds 49 to play any given piece, for which it is constructed in the usual well known manner. In order to have the music play only when it is desired, I have provided automatic means for turning the music off with each rotation of the roll 47, which corresponds to the completion of the particular piece being played. This construction consists of the knob 50 on the gear 45, and the knob 51 on the arm 52, so that when the gear 45 makes one complete revolution, the knob 50 will ride over the knob 51 and will disconnect the sliding clutch 42 from the fixed clutch 41, as shown in Fig. 5, in which position no music will be produced. When it is desired to produce music, the string or other means 53 is pulled to the left of Figs. 2 and 5 to reengage the clutch members 41 and 42. In order to retain the music producing mechanism in its operative or inoperative position, I provide the arm 52 with the head 57 which is provided with the notches 58 and 59 which are adapted to engage the ball 60 which is set in the bracket 61. The ball 60 is preferably tensioned with a spring 62, and when the ball 60 engages the notch 59, the clutches 41 and 42 are maintained in disconnected position, and when the ball 60 engages the notch 58, the clutches 41 and 42 are connected throughout the revolution of the gear 45 and until the knob 50 rides on the knob 51. It is of course understood that the arm 52 is pivotally mounted, as at 63, to permit the necessary movement. Suitably secured to the base 14 is the spider 67 which carries reflectors 68 and lights 69. The upper end of the spider 67 forms a seat 70 which is provided with the ball-bearings 71 which coact with the bearings 72 secured to the sleeve 25 by the bolt 73 to provide an anti-friction support for the sleeve 25 and the tree 26 carried thereby, and thus facilitates rotation.

The upper rotary part 12 of my device consists generally of a hood-like construction carried by the hub 76 which rests upon the flange 78 of the rotating bearing 72 so that, unless restrained, the upper part 12 of the device will rotate with the bearing 72 and sleeve 25. The upper part 12 is preferably composed of a series of frames in which are mounted a series of differently colored, transparent, or translucent plates 80, through which the light from the lamps 69 is reflected by the reflectors 68 upwardly against the tree 26, and, as the upper part 12 rotates, successively changing and different lighting effects are produced by the interposition of differently colored plates between the lights and the tree. The upper rotary part 12 is provided with a substantially vertical skirt, which either carries, or is composed of, either fixed or interchangeable, pictorial representations 84, which may be transparent, opaque, or translucent, and which depict biblical or other appropriate traditional designs, such as the Star of Bethlehem, a Christmas wreath, the Wise Men on the Camels, etc. The pictorial representations 84 are naturally subject to the illumination from the reflectors 68, as will be best understood from Figs. 2 and 3. In order to provide intermittent rotation of the upper part 12, I provide the bearing 72 with the cams 86 and depressions 87, and I mount a pin 88 in an opening in the flange 89 of the top 70 of the spider 67, the pin 88 being provided with a spring brake 90 which is adapted to bear against the inner surface of the pendant flange 92 of the hub 76. The pin 88 is carried by the arm 94 pivoted at 95 and normally tensioned inwardly by the spring 96, so that, when the inner end of the pin 88 rides on a low point 87, the spring 96 draws the brake 90 away from the flange 92 of the hub 76 and permits rotation of the upper part 12, and, when the inner end of the pin 88 rides on one of the cams 86, the brake 90 presses against the inner face of the pendant flange 92 and acts as a brake to stop the upper part 12 against rotation with the sleeve 25.

96 designates a cable which supplies current to the motor 32, the lamps 69, and, by means of the sliding contacts 98, to the wire 99, which, through the socket connection 100, supplies current to the wires 101 for illuminating the conventional lights on the tree 26.

Having thus described my invention what I claim as new and desire to secure by Letters Patent is:

1. A Christmas tree stand comprising a fixed lower portion formed of a base and a fenestrated vertical wall, a bracket mounted on said base, a cup-shaped member rotatably supported by said bracket and adapted to receive the stem of a Christmas tree, an upper rotatable portion comprising a translucent hood having a pendant flange composed of interchangeable, translucent shields and registering with said fenestrated vertical wall, a plurality of arms resting on said base and converging towards a central collar forming a bearing for said cup-shaped member and for said hood, a plurality of lights and reflectors therefor carried by said arms, a driving mechanism for continuously rotating said cup-shaped member and the tree carried thereby, a normally disengaged clutch mechanism intermediate said cup-shaped member and said hood whereby the former may rotate independently of the latter, and a cam on said cup-shaped member for intermittently engaging said clutch member to rotate said hood for a predetermined distance and intermittently with relation to the continuous rotation of said cup-shaped member.

2. A Christmas tree stand comprising a fixed lower portion formed of a base and a fenestrated vertical wall, a bracket mounted on said base, a cup-shaped member rotatably supported by said bracket and adapted to receive the stem of a Christmas tree, an upper rotary portion comprising a translucent hood having a pendant flange composed of interchangeable, translucent shields and registering with said fenestrated vertical wall, a plurality of arms resting on said base and converging towards a central collar forming a bearing for said cup-shaped member and for said hood, a plurality of lights and reflectors therefor carried by said arms, a driving mechanism for continuously rotating said cup-shaped member and the tree carried thereby, a normally disengaged clutch mechanism intermediate said cup-shaped member and said hood whereby the former may rotate independently of the latter, a music reproducing mechanism adapted to be actuated by said rotating mechanism, a cam device for disengaging said rotating mechanism from said music reproducing mechanism at the end of each complete revolution of the latter, and means for retaining said music reproducing mechanism out of engagement with said rotating mechanism.

ADAM FRITZ.